Figure 1:
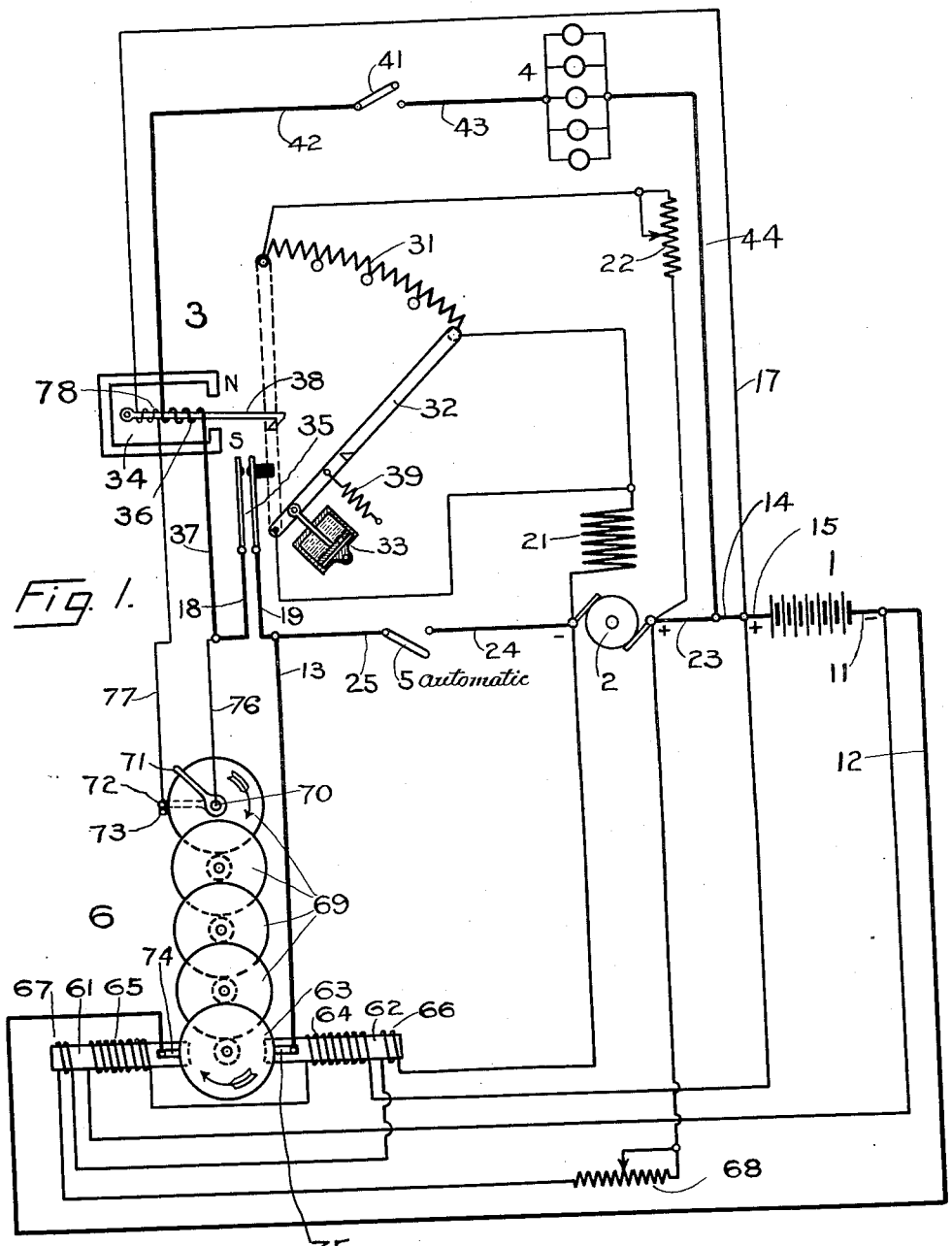

No. 896,188. PATENTED AUG. 18, 1908.
E. WRAY.
SYSTEM OF STORAGE BATTERY CONTROL.
APPLICATION FILED NOV. 20, 1906.
2 SHEETS—SHEET 1.

WITNESSES:

EDWARD WRAY,
INVENTOR.
BY
ATTORNEYS

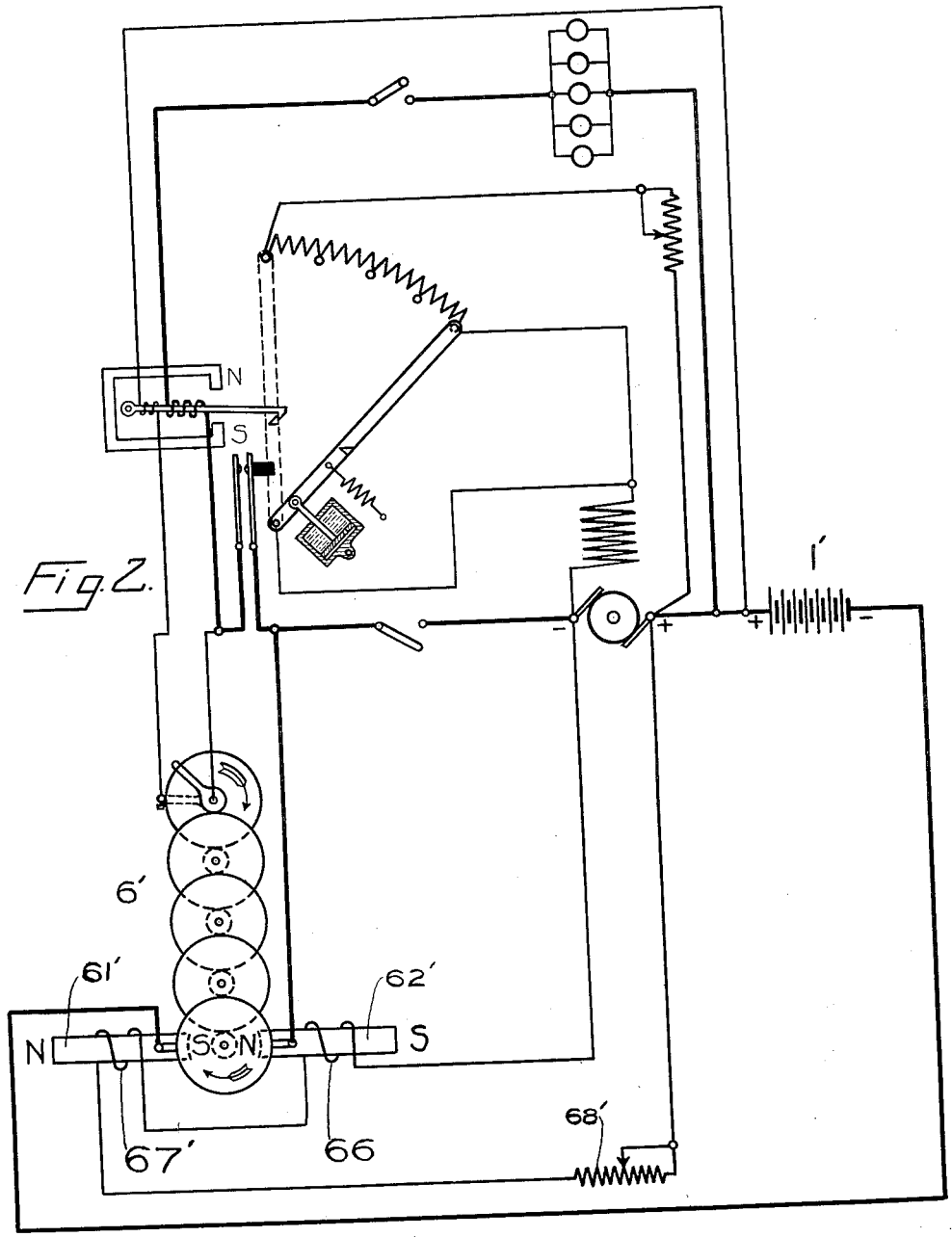

UNITED STATES PATENT OFFICE.

EDWARD WRAY, OF JANESVILLE, WISCONSIN.

SYSTEM OF STORAGE-BATTERY CONTROL.

No. 896,188.

Specification of Letters Patent.

Patented Aug. 18, 1908.

Application filed November 20, 1906. Serial No. 344,247.

*To all whom it may concern:*

Be it known that I, EDWARD WRAY, a citizen of the United States of America, and a resident of Janesville, county of Rock, and State of Wisconsin, have invented a new and useful Improvement in Systems of Storage-Battery Control, of which the following is a specification.

My invention pertains to apparatus for the control of storage batteries, and has as its object the provision of means whereby a storage battery may be charged from an intermittent or variably moving generator. Thus, with a generator on a car axle, a storage battery on the car and an electric lighting system operated from the storage battery, my invention would be installed for the proper operation of the generator in charging the storage battery to prevent it from excessively overcharging the battery.

To accomplish the desired result, I provide means whereby the generator is disconnected from the battery during such intervals as would not result in a useful current, and is disconnected when the battery reaches full charge as indicated by an integrating meter. I provide in the integrating meter means whereby, before the final disconnection of the charging generator, a charge is secured in any desired excess over the preceding discharge I provide means also whereby the charge of the battery is continued during the period of load without regard to the excess charge given. In providing for the excess of charge over the discharge, I employ means whereby a desired ratio is established between the two quantities before a balance is shown by the system, and I show in this description means whereby this ratio may be one of ampere hours to ampere hours, or one of watt hours to watt hours.

The field of usefulness of my invention is found in train or car lighting, and in any storage battery plant where the action of the charging generator is intermittent or uncertain, as when the generator is driven from the axle of a variably moving car, from a wind mill, from an intermittently active shaft, etc.

Two figures accompany this description, in which

Figure 1 shows the system of my invention with an integrating wattmeter, and Fig. 2 shows the system of my invention with an integrating ammeter.

In Fig. 1,—1 is a storage battery of polarity as marked; 2 is a charging generator of polarity as marked; associated with the charging generator 2 are the field coil 21 and the automatic regulator 22, shown in the drawings for simple illustration as a series variable resistance; 3 is a controlling device for the generator 2, consisting of a variable resistance 31, contact arm 32, and dash pot 33, a latching polarized electromagnet 34, and a switch 35; 4 represents the load to be carried by the battery 1 and generator 2, and is represented by a group of lamps; 41 is a switch for opening the load circuit; 5 is an automatic switch; 6 is an integrating wattmeter, having field magnets 61 and 62 and armature disk 63. All current from the battery 1, either charging or discharging, passes through the armature disk 63, discharge currents causing a revolution of the disk in the direction of the arrow shown thereon, and charging currents causing a revolution in the opposite direction. The field magnets 61 and 62 are double wound, having main windings 64 and 65 energized from the terminals of the battery 1 and having auxiliary windings 66 and 67 energized from the terminals of the generator 2. The currents through the auxiliary windings 66 and 67 oppose in the resulting magnetism the field produced by the main windings 64 and 65, and thus reduce the intensity of the integrating wattmeter's field when the potential of the generator 2 is high, but do not reduce it when the potential of the generator 2 is *nil*. A variable resistance 68 is associated with the auxiliary windings 66 and 67, whereby the degree of field reduction may be adjusted. Associated with the armature disk 63 is a train of gears 69 terminating in a shaft 70. The shaft 70 carries an electrical contact arm 71 adapted to make connection with the electrical contact point 72. A fixed stop 73 prevents the arm 71 from making a complete revolution, its travel being nearly a complete revolution, and the connection between 71 and 72 being made when the arm 71 is at one limit of its travel.

The switch 5 is an automatic switch, such as is commonly used in the care of storage batteries to cut the charging current on and off at proper conditions. In the switch illustrated, it is the function of the switch to close when the potential of the generator 2 is greater than the potential of the battery 1 so that a charging current will result; to hold closed during the continuance of the charging current; and to open upon cessation of the charging current or upon the reversal of the direction of the current through the switch 5 as would result after cessation of charge. As switches of this description are well understood in the art, it is thought unnecessary to illustrate the switch 5 in greater detail than that shown.

The operation of the system is as follows:—Assuming first that the arm 71 be in connection with the contact point 72, that the battery 1 be fully charged and that it is desired to place the load 4 in circuit. The main switch 41 is closed and the arm 32 is manually thrown to its alternative or dotted position, closing the switch 35 and completing a circuit through conductor 15, conductor 14, conductor 44, load 4 conductor 43, main switch 41, conductor 42, winding 36, conductor 37, conductor 18, switch 35, conductor 19, conductor 13, brush 75, armature disk 63, brush 74, conductor 12 and conductor 11. By closure of this circuit, current through the winding 36 in direction from conductor 42 to conductor 37 causes the free end of the armature 38 to become positive and this latches the arm 32 in its alternative position, holding the circuit closed; it will be noted that through the circuit comprising elements 1, 15, 17, 78, 77, 72, 71, 76, 18, 35, 19, 13, 75, 63, 74, 12, 11, the winding 78 would hold the free end of the armature 38 negatively magnetized, but that magnetization is overpowered by the magnetization resulting from the current through the load circuit and winding 36 and the latching of the arm 32 by the armature 38 results. Current thus passes through the armature disk 63 in direction from brush 75 to brush 74, and armature disk 63 is rotated in the direction of the arrow shown thereon. Through the train of gears 69 the shaft 70 is rotated in the direction of the arrow shown adjacent thereto, and the arm 71 is moved out of connection with the electrical contact point 72, its speed of motion being dependent upon the current flowing through the armature 63 and upon the intensity of the field magnets 61 and 62 attained by the main windings 64 and 65 receiving current from the battery 1, and if the generator 2 be at rest that field intensity is in no way reduced by the presence of the auxiliary windings 66 and 67. This condition will maintain as long as the generator 2 remains at rest, and the discharge of the battery may be measured by a computation based upon the angular travel of the arm 71.

Assuming now that the generator 2 becomes active, its potential will rise with its speed to approach the potential determined by the adjustment of the regulating element 22. When the potential of the generator 2 rises and becomes slightly greater than that of the battery 1, the automatic switch 5 operates to close the circuit between conductors 24 and 25. This results in current from generator 2 through conductors 23 and 44, load 4, conductor 43, main switch 41, conductor 42, winding 36, conductors 37 and 18, switch 35, conductors 19 and 25, automatic switch 5 and conductor 24. The generator 2, reaching its period of efficiency and being thus connected in circuit, will carry the load 4 and also supply a charging current through elements 23—14—15—1—11—12—74—63—75—13—25—5—24 passing through the armature disk 63 in the direction from brush 74 to brush 75, reversing the direction of rotation of the shaft 70, causing the arm 71 to return toward the contact point 72. Auxiliary field windings 66 and 67 now receive current from generator 2 in amount determined by the adjustment of the variable resistance 68 and have reduced the intensity of the field of the integrating wattmeter 6 by a ratio adjustable through means of the variable resistance 68. The integrating wattmeter 6 therefore records the current charging the battery 1 with an automatically applied corrective factor whereby a predetermined desired surplus of charge over discharge is required to return the arm 71 to connection with the electrical contact point 72. Let us assume at this point that during this charge the load is taken off of the system by the opening of the main switch 41, current thus ceasing through winding 36. There is no current through winding 78, due to the open circuit at 71—72 and arm 32 is held latched in its alternative position. Upon the completion of full charge, as determined by the integrating wattmeter 6 and its automatically applied corrective factor, the arm 71 makes connection with the contact point 72 and circuit is closed through elements 2—23—14—17—78—77—72—71—76—18—35—19—25—5—24 thus lifting the armature 38 and releasing the arm 32. The spring 39 withdraws the arm 32, but owing to the influence of the dash pot 33 this withdrawal is made slowly so that the resistance 31 is cut slowly into the field circuit of the generator 2 and the voltage of the dynamo 2 is reduced practically to *nil* regardless of the continuance or cessation of the speed of the generator armature.

Assuming that the armature of the generator 2 had been revolving at full speed when the load 4 was placed in circuit, the operation of the elements would have been modified in the following details: The main switch 41 being closed, the throwing over of the arm 32 would be gradual, owing to the influence of the dash pot 33, and the potential at the terminals of the generator 2 would have built up slowly in consequence thereof automatic switch 5 would have been reversed in position immediately and at the closing of switch 35 by arm 32 the generator 2 would have taken the load 4 and would have supplied current to the battery 1 immediately. Under the condition of a load in circuit and a fully charged battery with contact arm 71 in connection with contact point 72, the arm 71 is held against the fixed mechanical stop 73, and in electrical contact with the point 72. If under this condition the intermittently operating generator 2 ceases to carry the load 4 and the potential at its terminals therefore is reduced below that at the terminals of battery 1, current will flow from the battery 1 to carry the load 4, and also will flow through the elements 23—2—24—5—25—13 etc., thus reversing the direction of current through the automatic switch 5 and opening the connection between conductors 25 and 24 cutting out the generator 2. As this operation has reversed the direction of the current through the armature disk 63 from charging direction to discharging direction, the arm 71 moves away from the contact point 72 to be restored only by charge upon some later interval of operation of the generator 2.

It will be noted that when arm 32 is latched by armature 38, it may be held latched by winding 36, but may be unlatched only by winding 78 energized through contact of 71 and 72. Thus though the load 4 may be thrown off and the generator 2 may be inoperative, the charge of the battery 1 will be resumed at the first period of operation of the generator 2 and will be continued until arm 71 is restored to connection with electrical contact point 72.

Complete discharge of the battery is assumed to be represented by the arc described by arm 71 when it has passed nearly around its periphery and has engaged the fixed stop 73 at the limit of its travel, or by some similar arc. Thus, when the arm 71 is in engagement with the mechanical stop 73 at the limit of its travel distant from the contact point 72, a nominal complete charge of the battery 1 is required to restore 71 to connection with 72.

In Fig. 2 the sole difference from Fig. 1 lies in the field magnets 61' and 62' which in Fig. 2 are permanent magnets of that polarity determined by the windings 64 and 65 of Fig. 1. As the intensity of the field of the integrating meter 6' is not dependent upon the potential of the battery 1', the integrating meter 6' ceases to be a wattmeter and becomes an integrating ammeter. The charge of the battery is given with the corrective factor determined by the windings 66' and 67' as adjusted by the variable resistance 68', these windings being in Fig. 2 the sole windings of the magnetic field and corresponding to the auxiliary windings of Fig. 1. The ratio of charge to discharge in Fig. 2 thus is one of ampere hours to ampere hours, whereas in Fig. 1 it is one of watt hours to watt hours.

It will be seen, therefore, that my system of battery control possesses the following points of merit: (1) It protects the battery from that injurious overcharge so common in the operation of axle-driven equipments, resulting from the continuance of the charge after the battery is fully charged and when there is no load upon the system to require a further charge from the generator; (2) it insures a more reliable operation of the axle equipment, as the charge rate may be adjusted as high as may be required for the proper charging of the battery, thus insuring a quick recovery in case of a complete or nearly complete discharge of the battery; (3) it provides for an excess of charge current over discharge current, thus caring for the inefficiency of the storage battery; (4) the elements for control added by me do not change in any way the equipment or the operation of the carlighting systems as ordinarily installed and operated until the batteries have become fully charged, when my system operates to prevent injury; (5) normal operation of the carlighting system is resumed by the automatic devices when the lights are turned on; (6) it insures a better efficiency of equipment by operating the generator at full load for a short time rather than at part load for a longer time; (7) it provides that the battery charge be in excess over the battery discharge by any desired ratio, thus caring for any degree of efficiency of the storage battery; (8) the charging generator circuit is not modified in my system, and its circuit is opened or closed only in the ordinary way, at the automatic switch.

Although in some of the claims I have used the term, "carlighting system," I do not wish to limit myself thereby to the particular class of service in which storage batteries are used for carlighting purposes. It is obvious that my system is equally well adapted to isolated power plants where storage batteries are charged from any variable intermittent source of power. I wish, therefore, to have my claims thus broadly interpreted.

Having thus described my invention, what I claim as new and desire to secure by United States Letters Patent is:

1. In a battery control system, a load element; a generator-governing resistance; a switch arm controlling said generator-governing resistance and the load circuit including said load element; a battery; an electromagnetic latch for said switch arm; and a circuit including said battery, said load element and a winding in said electromagnetic latch whereby said switch arm is held locked throughout the period during which said load circuit is closed, substantially as described.

2. In a battery controlling system, a meter; an electric contact associated with said meter; a circuit controlling device having an electromagnetic latch; a source of current;

a circuit including said source of current said electric contact and a winding in said electromagnetic latch, whereby current will flow through said winding upon closure of said contact; a load element; and a second circuit including said source of current said load element and a second winding in said electromagnetic latch, whereby when said second circuit is closed current may flow through the second winding of said electromagnetic latch to oppose and overcome the influence of the current through said first winding and to prevent the operation of the electromagnetic latch by the first winding, substantially as described.

3. In a battery controlling system, a meter; an electric contact associated with said meter; an electromagnetic latch having two windings and forming a part of a circuit controlling device; a source of current; a circuit including said source of current said contact and one of said windings of said electromagnetic latch whereby current will flow through said winding upon closure of said contact and to operate said electromagnetic latch; a load element; and a load circuit including the second of said windings of said electromagnetic latch, whereby said first winding may be rendered inoperative by current flowing through said second winding throughout the period during which said load circuit is closed, substantially as described.

4. In a battery controlling system, a meter; an electric contact associated with said meter; an electromagnetic latch; a source of current; a circuit including said source of current, said contact and a winding in said electromagnetic latch whereby current will flow through said winding to operate said latch upon closure of said contact; a load element; and a circuit through said electromagnetic latch and said load element to neutralize said first mentioned circuit in said latch and rendering said electromagnetic latch inoperative throughout the period of current through said load element, substantially as described.

5. In a battery controlling system, an integrating meter having a magnetic field and having windings in the magnetic field; a source of current; and a connection between said source of current and windings in said magnetic field whereby the intensity of said magnetic field is reduced when said source of current is active, said reduction being in proportion to the potential of said source of current, substantially as described.

6. In a battery controlling system, a storage battery, a generator for charging said storage battery; charge and discharge circuits for said storage battery, said circuits having a common conductor; an integrating meter included in the common conductor of said charge and discharge circuits; coils upon the field magnets of said integrating meter and associated with said charging generator to reduce the intensity of magnetization of said field magnets when said charging generator is charging said battery; an electrical contact on said integrating meter; and means for stopping the charging current when said contact is closed and when no load is upon the system, and further means rendering said last mentioned means inoperative when the load circuit is being carried by the system, substantially as described.

Signed by me at New York county of New York and State of New York in the presence of two witnesses.

EDW. WRAY.

Witnesses:
IRVING FRANKEL,
D. S. RITTERBAND.